United States Patent
Bonen

(10) Patent No.: US 11,445,247 B2
(45) Date of Patent: *Sep. 13, 2022

(54) CATV EQUIPMENT FAST BOOT AFTER POWER INTERRUPTION

(71) Applicant: Harmonic, Inc., San Jose, CA (US)

(72) Inventor: Adi Bonen, Belle Mead, NJ (US)

(73) Assignee: Harmonic, Inc., San Jose, CA (US)

(*) Notice: Subject to any disclaimer, the term of this patent is extended or adjusted under 35 U.S.C. 154(b) by 378 days.

This patent is subject to a terminal disclaimer.

(21) Appl. No.: 16/847,624

(22) Filed: Apr. 13, 2020

(65) Prior Publication Data

US 2020/0288198 A1 Sep. 10, 2020

Related U.S. Application Data

(63) Continuation of application No. 16/660,571, filed on Oct. 22, 2019, now Pat. No. 10,623,814.

(60) Provisional application No. 62/754,471, filed on Nov. 1, 2018.

(51) Int. Cl.
*H04N 21/443* (2011.01)

(52) U.S. Cl.
CPC ..... *H04N 21/4432* (2013.01); *H04N 21/4431* (2013.01); *H04N 21/4435* (2013.01)

(58) Field of Classification Search
CPC .......... H04N 21/4432; H04N 21/4431; H04N 21/4435
USPC ...................... 713/2, 153, 300, 323; 348/730
See application file for complete search history.

(56) References Cited

U.S. PATENT DOCUMENTS

| 5,361,091 | A | * | 11/1994 | Hoarty | H04N 21/426 |
| | | | | | 375/E7.268 |
| 9,860,075 | B1 | * | 1/2018 | Gersberg | H04B 1/38 |
| 10,404,585 | B1 | * | 9/2019 | Bonen | H04B 15/005 |
| 10,411,656 | B1 | * | 9/2019 | Dick | H04L 27/08 |
| 10,715,702 | B1 | * | 7/2020 | Zhao | H04L 25/03 |
| 2016/0142788 | A1 | * | 5/2016 | Strong | H04N 21/4425 |
| | | | | | 725/82 |
| 2020/0099416 | A1 | * | 3/2020 | Dick | H04L 25/03057 |

* cited by examiner

*Primary Examiner* — John W Miller
*Assistant Examiner* — Omer Khalid
(74) *Attorney, Agent, or Firm* — Brokaw Patent Law PC; Christopher J. Brokaw

(57) ABSTRACT

Recovering a hardware component, such as a Remote MAC-PHY node (RMN), a wireless base station, a CATV amplifier, a Wi-Fi hotspot, a microcell, or a PON switch, after a power interruption. A hardware component, upon detecting that input power to the R-PHY device will be imminently interrupted, provides an alarm signal to a central processing unit (CPU) in the R-PHY device. The CPU, in response to receiving the alarm, stores running parameter data for the R-PHY device in a non-volatile memory. The running parameter data is normally obtained through network communications during a boot operation of the R-PHY device. If certain conditions are satisfied, then the R-PHY device recovers from the interruption in input power using the stored running parameter data without obtaining the running parameter data through a normal boot operation, thus shortening the boot time.

22 Claims, 4 Drawing Sheets

CATV EQUIPMENT FAST BOOT AFTER POWER INTERRUPTION

CLAIM OF PRIORITY

The present application claims priority to, and is a continuation of, U.S. patent application Ser. No. 16/660,571, entitled "CATV Equipment Fast Boot After Power Interruption," filed Oct. 22, 2019, the disclosure of which is hereby incorporated by reference for all purposes in its entirety as if fully set forth herein U.S. patent application Ser. No. 16/660,571 claims priority to U.S. provisional patent application No. 62/754,471, entitled "Last-Gasp-Aided R-PHY Device Fast Boot After Power Interruption," filed Nov. 1, 2018, the disclosure of which is hereby incorporated by reference for all purposes in its entirety as if fully set forth herein.

FIELD OF THE INVENTION

Embodiments of the invention generally relate to recovering a remote node after a power interruption.

BACKGROUND

Cable television (CATV) equipment, such as a Remote PHY node, is powered by quasi-square-wave AC power (QSW), which is carried by the same coaxial cable that carries the RF signal delivered to and from subscribers in a cable television system. Older CATV systems were limited to 60V QSW, while newer CATV systems often support 90V QSW, which enables a higher power transfer to devices (such as nodes, CATV amplifiers, Wi-Fi hot spots, and the like) connected to the coax distribution network.

Both the AC and the RF signals often travel through a coax distribution network that is composed of a chain of RF taps that are connected together by a length of coaxial hardline cable. These RF taps are used to tap some of the RF signal carried by the hardline coaxial cable and provide the tapped RF signal to drop cables which convey the tapped RF signal to subscribers' homes.

Taps are occasionally opened and maintained by cable technicians for various maintenance, repair, and testing tasks. The construction of these taps is such that the RF electronic circuitry that perform the bulk of its functionality is physically contained on a removable "face plate" of the tap rather than affixed within its base chassis. This enables easy replacement of the tap's electronic circuitry when the need arises without a need to splice a new tap to the hardline coaxial cable.

However, opening and removing the face plate of these taps causes an interruption in the signal path that travels in and out of the tap face plate and then continues to travel through the tap chain, thereby disconnecting both the RF signal and the QSW AC power from the rest of the chain. To solve this potential problem when tap face plates are removed, the taps are designed with a "make-before-brake" alternative path in the tap chassis. The mechanical action of removing the tap face plate causes disengagement of the signal path from the RF electronic part included in the face plate and the replacement of the signal path with an alternative path inside the tap chassis to provide continuity of the RF signal and the QSW AC power to the rest of the cable distribution network. The term make-before-brake signified that, during the removal of the tap face plate, the alternative path is established before the main path is removed, allowing the RF signal and the QSW AC power to flow through the tap before, during and after the removal operation. Similarly, during the reinsertion of the tap face plate, the main path is established before the alternative path is removed, allowing the RF signal and the QSW AC power to flow through the tap before, during and after the reinsertion operation.

Unfortunately, quite often the make-before-brake mechanism in the tap does not operate as intended. This can happen when the tap face plate is removed while slightly askew, which causes one of the tap face plate's two connections (i.e., the in port or the out port) to disengage from the tap chassis before the other connection is disengaged. This sequential disengagement can cause a very short interruption, typically lasting in the order of several hundreds of milliseconds, in the RF signal and the QSW AC propagation through the tap chain. As a result, an active CATV device which is being powered by the QSW AC power propagating through the tap chain will experience a short interruption of power, and will often lose its ability to operate for a short period, corresponding to the length of interruption plus a recovery time once the QSW AC power is restored.

In a traditional analog cable distribution system (i.e., a cable distribution system existing prior to the use and inclusion of sophisticated CPU embedded signal processing elements in the outside plant portion of the system), such an interruption caused by removing a tap face plate would typically cause the delivery of cable services to customers to be interrupted for less than a second. The traditional analog cable system equipment that is installed at the customer premises is designed to "survive" such interruptions without having much, if any, lasting ramifications. A user may experience a very short "tiling" on his TV screen, an almost unnoticeable momentary slowdown in Internet access, or a very short brake in audio during a call using a cable connected telephone, but all these will disappear after a second or so.

However, when CPU-embedded signal processing devices, which may be installed on the cable distribution plant, experience a similar such split-second interruption in their QSW AC powering source, these CPU-embedded devices often require several minutes to recover from such a power interruption, which is far more noticeable to customers. Cable services delivered to customers through them will often suffer corresponding long periods of interruption even if the source power interruption was just several hundreds of milliseconds.

The line power supply that shapes and feeds the QSW power to the coax distribution network is designed to provide various protection and safety mechanisms. Among these protection mechanisms, the line power supply limits the maximum current that can be withdrawn by the cable plant. Specifically, when the amount of current withdrawn is too high, the line power supply can reduce the QSW voltage. In more extreme cases of high current withdraw lasting several seconds (such as when a short circuit is applied somewhere to the coax), the line power supply may remove its output voltage completely from the coax distribution network, which typically results in the loss of all cable services provided through the coax distribution network.

Since the loss of services is a severe adverse effect, the line power supply is required by design to try and resume the delivery of power to the coax distribution network. This is done to enable the recovery of CATV devices when the issue that caused the high current withdraw was only temporary and is no longer present, and to prevent the need for a manual maintenance and repair action that may take a substantial time to commence (typically an hour or more).

The line power supply is typically designed to try to resume normal operation every configurable length of time that can range over several seconds to several minutes.

Thus, a technician working on a part of the coax distribution network has the potential to cause a momentary electrical short, which, if lasting less than a few seconds, will typically cause loss of QSW AC power for a similar time, while a short circuit that lasts longer will typically cause the line power supply to protect the CATV system from excessive current by removing the QSW power from the coax distribution network for the configured length of time. When the coax distribution network is driven by traditional HFC equipment and nodes, the resulting service interruption to subscribers is often limited to the same several seconds or minutes as well, although some customer premises equipment (CPE), such as cable modems, will be required to register to the cable operators network again after cable signals are resumed, resulting in a loss of service that may last several minutes more than the power interruption itself.

Advanced systems, such as the CableLabs specified Remote-PHY system, offer many advantages to cable operators. Unfortunately, the R-PHY system introduces some disadvantages as well. One such disadvantage is the typical long restart process the R-PHY device (RPD) has to undergo when powered on, which includes a software boot process, a network authentication process, obtaining an Internet Protocol (IP) address, a timing synchronization process, registering with the R-PHY system, a configuration process, and turning on services. As a result, even a short split second power interruption which causes a similar split second interruption of cable services in a traditional hybrid fiber-coaxial (HFC) cable network can cause as much as 10 minutes of cable services interruption when these services are delivered by an RPD or an R-MACPHY device (RMD).

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Approaches recovering a Remote PHY (R-PHY) device after a power interruption are presented herein. In the following description, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form or discussed at a high level in order to avoid unnecessarily obscuring teachings of embodiments of the invention.

Embodiments of the invention advantageously minimize down time in service due to an interruption in power for modern CATV devices, such as cable network equipment corresponding to or supported by a RPD or a RMD. To do so, it is desirable to shorten the time required for such modern CATV devices to boot once power resumes.

Figure 1:
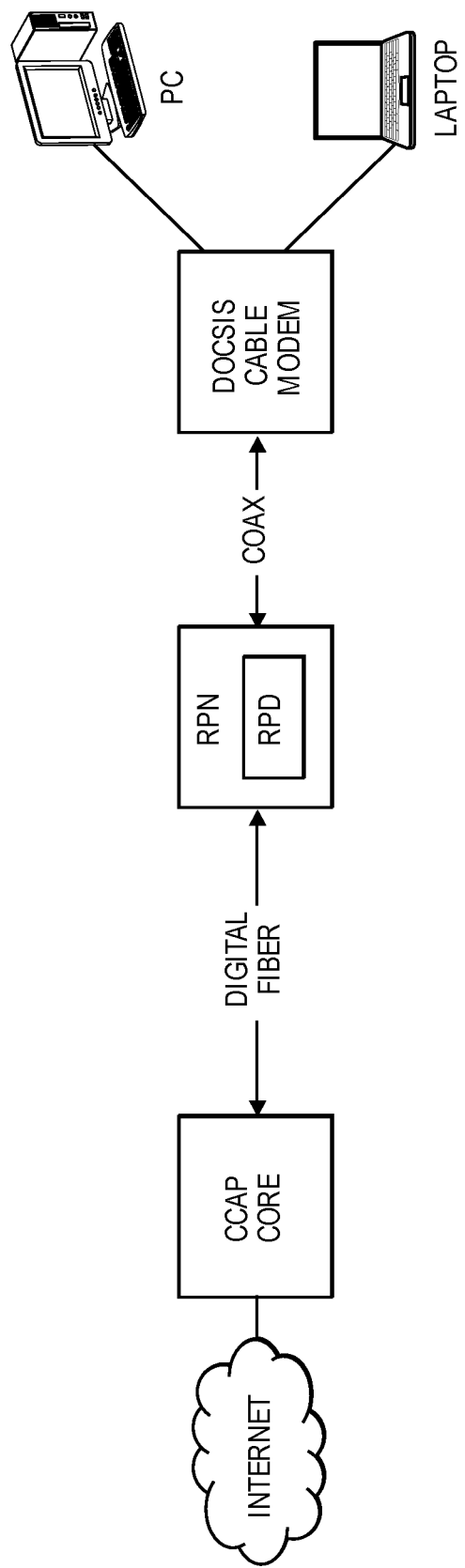
FIG. 1 is a block diagram of a CCAP platform which includes a Remote PHY device (RPD) in accordance with the prior art.

Embodiments of the invention may be deployed in a Converged Cable Access Platform (CCAP) platform. CableLabs has publicly issued a Remote PHY family of specifications, known as the MHAv2 specifications (Modular Headend Architecture version 2). These specifications describe how a CCAP platform may be separated into two components, (1) a CCAP Core located at a cable headend, and (2) a Remote PHY device (RPD), which is typically located outdoors. A RPD may be located, for example, at the junction of the fiber and coax plants in an optical node serving as a Remote PHY Node (RPN). A CCAP core can control and setup data paths with multiple RPDs situated in multiple fiber nodes. FIG. 1 is a block diagram of a CCAP platform which includes an RPD situated inside an RPN in accordance with the MHAv2 specifications of the prior art.

CableLabs has also issued a technical report about the R-MACPHY architecture and is currently undertaking an effort to formalize a specification for R-MACPHY products, specifically a Remote MACPHY Device (RMD) which resides in a Remote MACPHY node (RMN). This technical report describes Remote MACPHY (or MAC-PHY) as a generic term given to the distributed CMTS/CCAP architecture where the DOCSIS MAC and PHY layer processing of a CMTS are moved from the headend down to a Fiber Node location. Embodiments of the invention may be employed within the technical environment of a R-MAC-PHY architecture as well.

Figure 2:
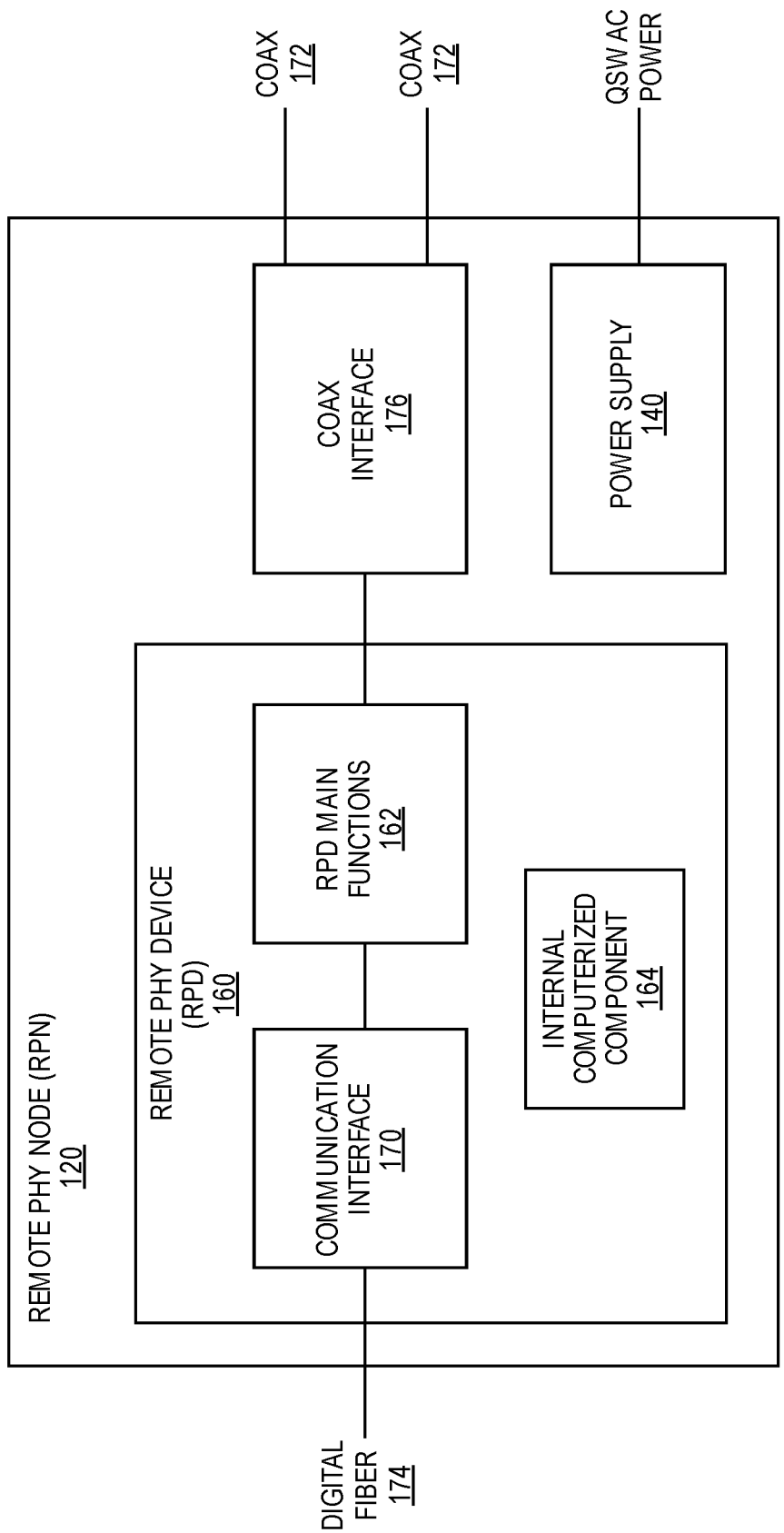
FIG. 2 is a block diagram of a Remote PHY node (RPN) which includes a power supply and a Remote PHY device (RPD) according to an embodiment of the invention.

FIG. 2 is a block diagram of a Remote PHY node (RPN) which includes a power supply and a Remote PHY device (RPD) according to an embodiment of the invention. The function of RPN 120 is to convert downstream DOCSIS data, MPEG video, and out-of-band (OOB) signals from digital to analog one way and transmit them over a plurality of coaxial cables 172 leading to cable subscribers' homes, and receive upstream data, video, and OOB signals from coaxial cables 172 in analog format and convert them to digital the other way. The digital signals are exchanged between the CCAP Core and the RPD, comprised within the RPN, typically over digital fiber 174. RPN 120 may send and receive data over communication links, such as coaxial cables 172 and/or digital fiber 174, using coax interface 176 and communication interface 170, respectively.

Remote PHY nodes, such as RPN 120, are designed to be deployed outdoors near the physical area to be serviced by RPN 120. A non-limiting, illustrative example of RPN 120 includes Harmonic, Inc.'s CableOS™ Ripple-1 Remote PHY node.

RPN 120 is composed of an outer housing that surrounds at least one power supply 140 and at least one Remote Device (RPD) 160. The outer housing of RPN 120 is designed to provide a hermetically sealed environment to the interior of RPN 120. The hermetically sealed environment provided by the outer housing of RPN 120 helps protect internal components such as power supply 140 and RPD 160 from outdoor environmental factors, such as humidity, water, debris, and changes in pressure.

Communication interface 170 in FIG. 2 may comprise an optical network transceiver (such as SFP), but embodiments may also be employed in contexts where access to other types of communication interface, such as a wireless network, instead of or in addition to the optical network, is available. In addition to data transmitted through the RPN 120 to and from cable subscribers, and in addition to communications required to fulfill the operation of the RPD Main Functions 162, Internal Computerized Component 164 of the RPD may send and receive data communications over the optical network (or over a wireless network in contexts where such a network is available). This advantageously allows an operator or technician to send and receive data to RPN 120 deployed in the field, such as for purposes of configuring the operation of RPN 120, providing additional or revised data or executable instructions to RPN 120, and/or receiving information for monitoring various aspect of RPN 120 and its internal components.

While embodiments shall chiefly be described with reference to concreate examples involving a RPD or equipment supported by a RPD, other embodiments of the invention may be employed in other contexts. Embodiments may be used in a wide variety of modern HFC equipment, including but not limited a RPD or a R-MACPHY device (RMD).

While RPD developers use best efforts to efficiently implement each part of the boot process, some of the more lengthy operations involved in the boot process are largely dependent on external elements. These include such operations as network authentication and parameter acquisition, Internet Protocol (IP) address acquisition, registration with remote elements such as the R-PHY system, and IEEE 1588 timing acquisition. These operations typically contribute to as much as two thirds of the total boot time.

When an RPD restarts after a very short interruption, it is possible for the RPD to considerably shorten the boot time by skipping some of the normal boot operations by assuming the operational parameters used prior to the power interruption have not changed and, as a consequence, employing those operational parameters without reobtaining them by undergoing a new boot process. When an RPD restarts after a very short interruption, the network and some R-PHY system servers may not even be aware yet that the RPD went offline. Moreover, if the RPD were to undergo a normal full-process boot, it would reacquire the very same operational parameters as they existed before the power failure. Thus, if the RPD could save its key operational parameters in a nonvolatile memory (NVM) just before it lost power, and then during the boot process automatically read them from the NVM and restore them to operation, the boot process could be shorten by as much as two thirds.

Some difficulties exist in saving the most up to date run-time operational parameters in a non-volatile memory. Some types of these parameters (for example, timing synchronization parameters) continuously change and adapt to various conditions and events experienced by the R-PHY system. Continuously saving these parameters every time a change occurs requires frequent write operations to be performed using the NVM, and as a consequence, may adversely affect the operational lifespan of the NVM, as only a finite number of write operations are typically supported by the NVM.

A more advantageous scheme will be detecting that a power failure is about to occur and only writing the operational parameters to the NVM just after the power failure detection and before the power completely goes down. Embodiments of the invention will be presented herein that observe this principle.

Note that being able to use previously saved operational parameters is not suitable for every situation in which an RPD is booted. If the RPD went down and was rebooted due to a reason other than an RPN power failure, the use of the previous runtime operational parameters can cause a malfunction, which in turn would require another reset and reboot to resolve, and thus, result in an even longer overall boot time. For example, if the reboot was caused by an intentional reset that was invoked by a technician, an automated external system, or by an internal RPD mechanism (such as a watchdog), it is very likely that there was a problem with the prior runtime operational parameters or state, or there otherwise exists good reasons for acquiring new operational parameters. Accordingly, after an intentional reset, skipping any of the normal boot steps by using previously stored parameters will be counterproductive.

In another example, if the RPD was removed from one RPN and plugged in to another RPN, the RPD is now connected to a new network point. By virtue of being connected to a new network point, the RPD must undergo network authentication and IP address acquisition, as using previously stored operational parameters at a new network point will most likely cause malfunction.

Yet another example involves a case when a RPN is shut down for a long time. Shutting down a RPN for an extended period of time results in the network "forgetting" the RPD, and any saved timing parameters become "aged" and inaccurate. Thus, using previously stored operational parameters when a RPN is shut down for a long time will most likely cause malfunction.

It is important to restrict the use of operational parameters written to the NVM just before an interruption in power to identified cases of recovery and only when recovering from a relatively short power interruption. Embodiments of the invention discussed herein positively identify when such conditions are satisfied.

A known mechanism called "last gasp" is an early indication of power loss that allows a system to perform some operations in preparation for the loss of power, and complete those operations before shutting down due to power loss. Such operations can include signaling to an external system that communication is about to be lost due to a power failure or saving important parameters in a NVM before the power is lost.

Figure 3:
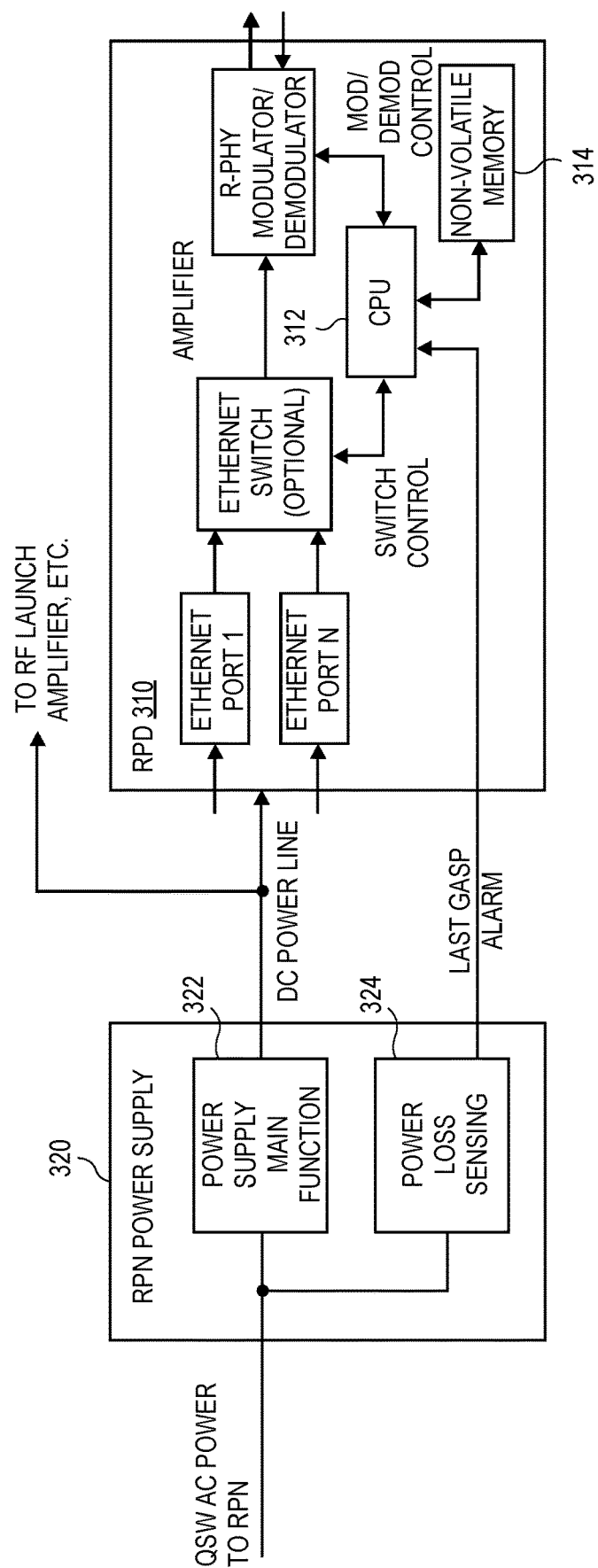
FIG. 3 is a block diagram of a Remote-PHY Node (RPN) according to an embodiment of the invention.

FIG. 3 is a block diagram of a Remote-PHY device (RPD) 310 according to an embodiment of the invention. As shown in FIG. 3, RPN power supply 320 supplies power via a DC power line to RPD 310 and to other components such as a RF launch amplifier. RPN power supply 320 may correspond to power supply 140 shown in FIG. 2. RPN power supply 320 may comprise power supply main function 322 and power loss sensing component 324. Power supply main function 322 performs the main functions required by the power supply of the RPN.

Power loss sensing component 324, as broadly used herein, refers to any component which may detect that input power to RPD 310 has just been interrupted or will be imminently interrupted. While power loss sensing component 324 is depicted in FIG. 3 as being part of RPN power supply 320, other embodiments may implement power loss sensing component 324 in other locations.

Figure 4:
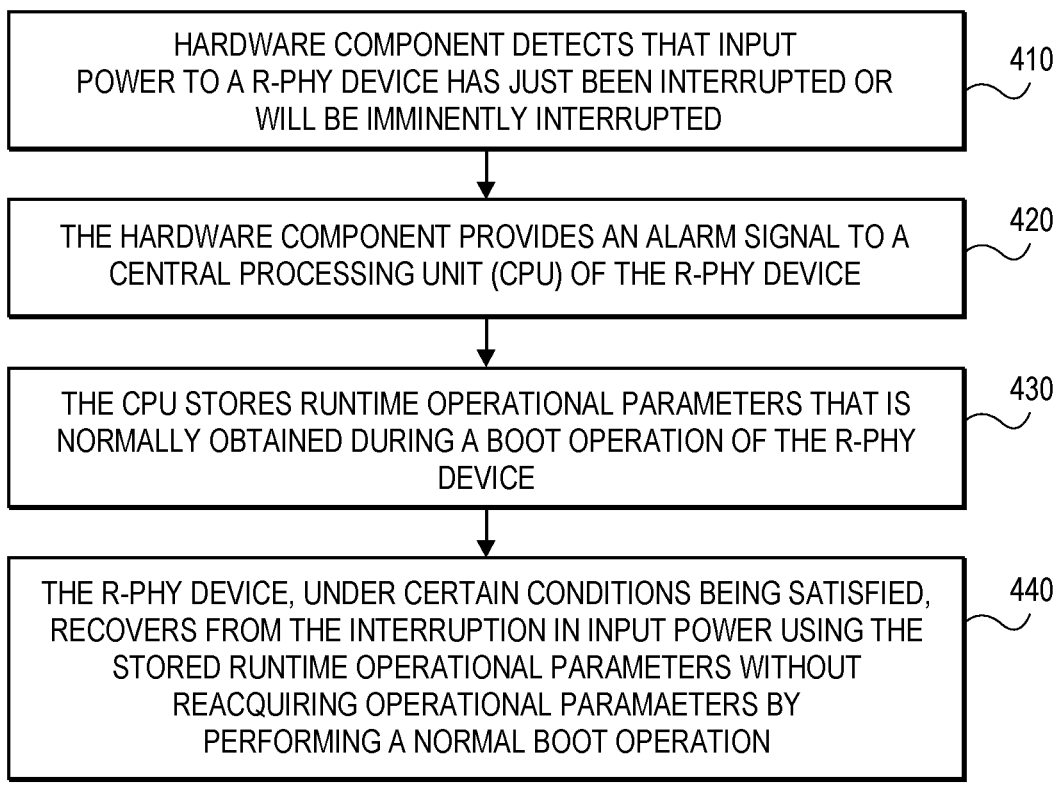
FIG. 4 is a flow chart illustrating the steps of recovering a Remote PHY (R-PHY) device after a power interruption in accordance with an embodiment of the invention.

FIG. 4 is a flow chart illustrating the steps of recovering RPD 310 after a power interruption in accordance with an embodiment of the invention. In step 410, a hardware component detects that input power to a R-PHY device has just been interrupted or will be imminently interrupted. Step 410 may be accomplished by power loss sensing component 324 detecting that input power to RPD 310 has just been interrupted or will be imminently interrupted.

Power loss sensing component 324 may continuously monitor the voltage of the QSW AC input power to RPN 320. In an embodiment, power loss sensing component 324 may comprise a mechanism to measure the QSW voltage, and to detect when the QSW voltage goes below a predetermined threshold that is below the normal QSW operating voltage range as an indication that power is about to be interrupted.

In step 420, when power loss sensing component 324 senses that the QSW AC input power to RPN 320 is lost, power loss sensing component 324 can provide an alarm signal on a dedicated line to Central Processing Unit (CPU) 312 in RPD 310. In an embodiment, the alarm signal may be, but need not be, a hardware alarm signal.

After power loss sensing component 324 senses that the QSW AC input power to RPN 320 is lost, RPN power supply 320 typically still retains the output voltages feeding the RPN elements (including RPD 310) for a short duration (typically several tens of milliseconds), while sufficient charge still remains in the electrolytic capacitors and/or other energy storage components internal to RPN power supply 320. This enables power loss sensing component 324 to provide the alarm signal on the dedicated line to CPU 312 in RPD 310 for a short period of time before DC power to RPD 310 is lost.

In step 430, in response to receiving the alarm signal, RPD 310 saves all relevant runtime operational parameters which are required for a fast boot operation in non-volatile memory (NVM) 314. The saved runtime operational parameters should include such information as network authentication parameters, network parameters (e.g., IP addresses of itself and of other various servers with which RPD 310 communicates), IEEE 1588 timing acquisition parameters, configuration parameters, current time, and a special last gasp flag that is set to active.

In step 440, when certain conditions are satisfied, RPD 310 may recover from the interruption in input power using the stored runtime operational parameters without reacquiring operational parameters by performing a normal boot operation. Embodiments may determine whether those certain conditions are satisfied using a flag to indicate that a last gasp recovery mode was entered, as shall be explained below.

The alarm signal will typically be provided by power loss sensing component 324 after a very short (e.g., several milliseconds) duration after the expected QSW AC power is missing from the input to RPN power supply 320, such that there is enough time for RPD 310 to perform all the required last gasp operations before the power supplied by RPN power supply 320 becomes unavailable. RPN power supply 320 is typically designed such that a very short interruption (e.g., several tens of milliseconds) in the input power is compensated for by the energy stored in electrolytic capacitors inside RPN power supply 320. These very short interruptions may exist in the input power due to power relay switching as a utility power company switches between sources of power over their network. Specifically, RPN power supply 320 is typically designed to maintain its output without deterioration when one or two cycles of the 60 Hz (or 50 Hz) power are "missing." Thus, such very short interruptions will cause the last gasp alarm to be asserted, but the missing energy will be replenished by RPN power supply 320 without interrupting the power supplied to RPD 310.

For this reason, in an embodiment, the recovery process of RPD 310 identifies whether RPD 310 is operating within a reasonable time (e.g., one second) after the alarm of step 420 was asserted. If RPD 310 determines that it is still operating within a reasonable time after the alarm of step 420 was asserted, then the last gasp flag in the NVM will be deasserted and the RPN will exit the last gasp process and resume normal operation.

When a RPD performs a boot operation, very early in the execution of the RPD initialization of the firmware, right after the RPD firmware is loaded, the RPN must determine if a fast boot process should be performed. The first condition for determining whether a fast boot process should be performed is whether a last gasp flag stored in NVM 314 is active (asserted). If RPD 310 was shut down for any reason other than a last gasp (RPN power interruption), including when the RPD 310 was shut down deliberately or the RPD 310 software was reset, RPD 310 will not save its runtime operational parameters in NVM 314, and more importantly, the last gasp flag in NVM 314 will be inactive (deasserted). Thus, upon the initiation of a boot operation, by checking the status of a last gasp flag stored in NVM 314, RPD 310 can ascertain if the boot occurred due to a power interruption to the RPN.

A second condition for determine whether a fast boot process should be performed is whether too much time had elapsed since the runtime operational parameters were saved. The runtime operational parameters stored in NVM 314 include the time at which those parameters were stored. RPD 310 thus needs to obtain the current time in order to calculate how much time has elapsed since those runtime operational parameters were stored. Some RPD implementations may include an always-operating real time clock device, which is typically powered by an independent small embedded battery. Such an RPD can easily obtain the current time by reading it from the local real-time device. Otherwise, the RPD may need to fetch the current time from a Time of Day (ToD) server on the network. This operation should be attempted by using stored network information from NVM 314 (e.g., the RPD's own IP address and the ToD server IP address). However, if the ToD server cannot be contacted using network parameters saved in NVM 314 after a predetermined timeout or number of unsuccessful attempts, then the RPD may proceed with performing a regular (i.e., the normal, longer) boot process. Similarly, if, after obtaining the current time, the RPD determines that the difference between the current time and the time when the runtime operational parameters were stored in NVM 314 is too long or exceeds a predetermined amount of time, the RPD resets the last gasp flag stored in NVM 314, flushes or otherwise renders invalid the runtime operational parameters stored in NVM 314, and proceeds with the regular (i.e., the normal, longer) boot process (including network authentication, network parameters acquisition, etc.).

If both the first and second conditions are met (i.e., the last gasp flag in NVM 314 is active and the time elapsed is shorter than a maximum acceptable duration the runtime operational parameters were stored), then RPD 310 can continue with the fast boot using the runtime operational parameters stored in NVM 314, thereby skipping the reacquisition of those parameters.

The definition of the maximum acceptable duration since the runtime operational parameters were stored is dependent on various system parameters. This maximum acceptable duration should include allocation for operations that are conducted during the boot process before the time elapsed calculation can take place (e.g., the loading of the RPD firmware, the self-test, operation system initialization, obtaining of the current time, etc.), as well as allocation for the actual maximum expected power interruption duration after which fast boot is desired. Moreover, this maximum acceptable duration is also bound by the expected length of time that communication loss with various remote servers is acceptable, before some operational parameters become aged or before communication with some servers has to be reinitialized. For example, an RPD designer may consider fast recovery from a power interruption that may last up to 5 minutes to be a desirable target, and may estimate a maximum duration of 1 minute from the time that the power to the RPN resumes until the RPN obtains the current time, and can resume communication with remote servers before operational parameters become invalid. Thus the RPD designer may set the maximum acceptable duration between the time when runtime operational parameters were stored and the obtained current time after power resumed to 6 minutes as the sum of these two amounts of time.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. An apparatus for recovering a remote node after a power interruption, comprising:
   a hardware component capable of providing an alarm signal to a central processing unit (CPU) in the remote node upon detecting that input power to the node has been or will imminently be interrupted,
   wherein the remote node is a Remote MACPHY node (RMN) that comprises a Remote MACPHY device (RMD), a wireless base station, a CATV amplifier, a Wi-Fi hotspot, a microcell, or a passive optical network (PON) switch;
   the CPU capable of storing running parameter data for said remote node in a non-volatile memory, wherein running parameter data is normally obtained during a boot operation on the remote node through network communications; and
   the remote node configured to, under certain conditions being satisfied, recover from the interruption in input power using said stored running parameter data without obtaining said running parameter data through a normal boot operation.

2. The apparatus of claim 1, wherein said running parameter data includes one or more of: network authentication parameters, network parameters, IEEE 1588 timing acquisition parameters, configuration parameters, and a current time.

3. The apparatus of claim 1, wherein storing running parameter data for said remote node comprises setting a flag to indicate a recovery mode was entered due to power interruption, and wherein the status of the flag affects, at least in part, how the remote device performs a boot operation.

4. The apparatus of claim 1, wherein the hardware component is a power supply for said remote node.

5. The apparatus of claim 1, wherein said certain conditions include (a) whether a flag to indicate a recovery mode was entered is set, and (b) whether an amount of time between the providing of the hardware alarm signal to the CPU and the restoration of the input power to the remote device is less than a predetermined amount of time.

6. The apparatus of claim 1, wherein said certain conditions include determining that the input power to the remote node was not deliberately interrupted.

7. The apparatus of claim 1, wherein said certain conditions include determining that the remote node is coupled to a new or unexpected remote node.

8. The apparatus of claim 1, wherein the CPU receives power for storing running parameter data for said remote node from electrolytic capacitors located inside a power supply of the remote node.

9. The apparatus of claim 1, wherein the CPU receives power for storing running parameter data for said remote node from an energy storage device inside the remote node or another module inside the remote node.

10. The apparatus of claim 1, wherein the CPU is configured to use during a shortened boot process the stored running parameter data for said remote node only if said remote node determines that the input power to the remote node was not deliberately interrupted.

11. A method for recovering a remote node after a power interruption, comprising:
    upon detecting that input power to the remote node has been or will imminently be interrupted, providing an alarm signal to a central processing unit (CPU) in the remote node,
    wherein the remote node is a Remote MACPHY node (RMN) that comprises a Remote MACPHY device (RMD), a wireless base station, a CATV amplifier, a Wi-Fi hotspot, a microcell, or a passive optical network (PON) switch;
    the CPU storing running parameter data for said remote node in a non-volatile memory, wherein running parameter data is normally obtained during a boot operation on the remote node through network communications; and
    upon determining certain conditions are satisfied, recovering from the interruption in input power to said remote device using said stored running parameter data without obtaining said running parameter data through a normal boot operation of said remote node.

12. The method of claim 11, wherein said running parameter data includes one or more of: network authentication parameters, network parameters, IEEE 1588 timing acquisition parameters, configuration parameters, and a current time.

13. The method of claim 11, wherein the CPU storing running parameter data for said remote node comprises setting a flag to indicate a recovery mode was entered due to power interruption, and wherein the status of the flag affects, at least in part, how the remote node performs a boot operation.

14. The method of claim 11, wherein a power supply for said remote node detects that the input power to the remote node will be imminently interrupted.

15. The method of claim 11, wherein said certain conditions include (a) whether a flag to indicate a recovery mode was entered is set, and (b) whether an amount of time between the providing of the hardware alarm signal to the CPU and the restoration of the input power to the remote node is less than a predetermined amount of time.

16. The method of claim 11, wherein said certain conditions include determining that the input power to the remote node was not deliberately interrupted.

17. The method of claim 11, wherein said certain conditions include determining that the remote node is coupled to a new or unexpected remote node.

18. The method of claim 11, wherein the CPU receives power for storing running parameter data for said remote node from electrolytic capacitors located inside a power supply of the remote node.

19. The method of claim 11, wherein the CPU receives power for storing running parameter data for said remote node from an energy storage device inside the remote node or another module inside the remote node.

20. The method of claim 11, wherein the CPU is configured to use during a shortened boot process the stored running parameter data for said R-PHY device only if the remote node determines that the input power to the remote node was not deliberately interrupted.

21. A Cable Television (CATV) equipment for recovering after a power interruption, comprising:
one or more embedded central processing units (CPUs);
a hardware component capable of providing an alarm signal to at least one of the one or more central processing units in CATV equipment upon detecting that input power to the CATV equipment has been or will imminently be interrupted,
wherein the hardware component is a Remote MACPHY node (RMN) that comprises a Remote MACPHY device (RMD), a wireless base station, a CATV amplifier, a Wi-Fi hotspot, a microcell, or a passive optical network (PON) switch;
the at least one CPUs capable of storing running parameter data for said CATV equipment in a non-volatile memory, wherein running parameter data is normally obtained during a boot operation on the CATV equipment through network communications; and
the CATV equipment configured to, under certain conditions being satisfied, recover from the interruption in input power using said stored running parameter data without obtaining said running parameter data through a normal boot operation.

22. The CATV equipment of claim 21, wherein the hardware component is a power supply.

* * * * *